(12) United States Patent
Hein et al.

(10) Patent No.: US 10,882,572 B2
(45) Date of Patent: Jan. 5, 2021

(54) TRAILER UNDERBODY FAIRING SYSTEM

(71) Applicant: Windyne Fairing Co. Ltd., Hanna (CA)

(72) Inventors: Duane Edwin Hein, Hanna (CA); Alec Costerus, Parker, CO (US)

(73) Assignee: Windyne Fairing Co. Ltd., Hanna (CA)

( * ) Notice: Subject to any disclaimer, the term of this patent is extended or adjusted under 35 U.S.C. 154(b) by 8 days.

(21) Appl. No.: 16/194,116

(22) Filed: Nov. 16, 2018

(65) Prior Publication Data

US 2019/0276096 A1 Sep. 12, 2019

Related U.S. Application Data

(60) Provisional application No. 62/639,854, filed on Mar. 7, 2018.

(51) Int. Cl.
*B62D 35/00* (2006.01)
*B62D 25/18* (2006.01)
*B62D 25/16* (2006.01)

(52) U.S. Cl.
CPC .......... *B62D 35/001* (2013.01); *B62D 25/168* (2013.01); *B62D 25/184* (2013.01)

(58) Field of Classification Search
CPC .... B62D 35/001; B62D 35/02; B62D 35/008; B62D 25/184; B62D 25/168
See application file for complete search history.

(56) References Cited

U.S. PATENT DOCUMENTS

| | | |
|---|---|---|
| 5,609,384 A | 3/1997 | Loewen |
| 6,644,720 B2 | 11/2003 | Long et al. |
| D871,984 S | 1/2020 | Munsell |
| D876,300 S | 2/2020 | Chiang |
| D885,271 S | 5/2020 | Lu |
| D885,272 S | 5/2020 | Smith et al. |
| D886,012 S | 6/2020 | Heinemann |
| D890,655 S | 7/2020 | Poyorena et al. |
| D890,656 S | 7/2020 | Ninov et al. |
| D891,334 S | 7/2020 | Woodhouse et al. |
| 2017/0029044 A1* | 2/2017 | Senatro ................ B62D 35/001 |
| 2018/0043418 A1 | 2/2018 | Lofstrom et al. |
| 2018/0072354 A1 | 3/2018 | Cosme et al. |
| 2019/0276096 A1 | 9/2019 | Hein et al. |
| 2019/0382059 A1 | 12/2019 | Bradley |
| 2020/0207426 A1 | 7/2020 | Motter et al. |

\* cited by examiner

*Primary Examiner* — D Glenn Dayoan
*Assistant Examiner* — Melissa Ann Bonifazi
(74) *Attorney, Agent, or Firm* — Seed Intellectual Property Law Group LLP (57) ABSTRACT

The present disclosure pertains to fairings for use on a trailer having a movable bogie. In one implementation, panels of the fairing extend at least to a rear termination point of the movable bogie and include a slim hinge to prevent interference with a pair of wheels coupled to the bogie. Accordingly, implementations of the present disclosure include a fairing that allows for translation of the movable bogie, while also providing panel coverage up to and beyond a pair of wheels coupled to the bogie regardless of the bogie position relative to the trailer.

20 Claims, 8 Drawing Sheets

TRAILER UNDERBODY FAIRING SYSTEM

BACKGROUND

Technical Field

The present disclosure pertains to aerodynamic structures for use on highway vehicles to reduce drag and, more particularly, to fairings for use on a trailer having a movable bogie.

Description of the Related Art

Figure 1:
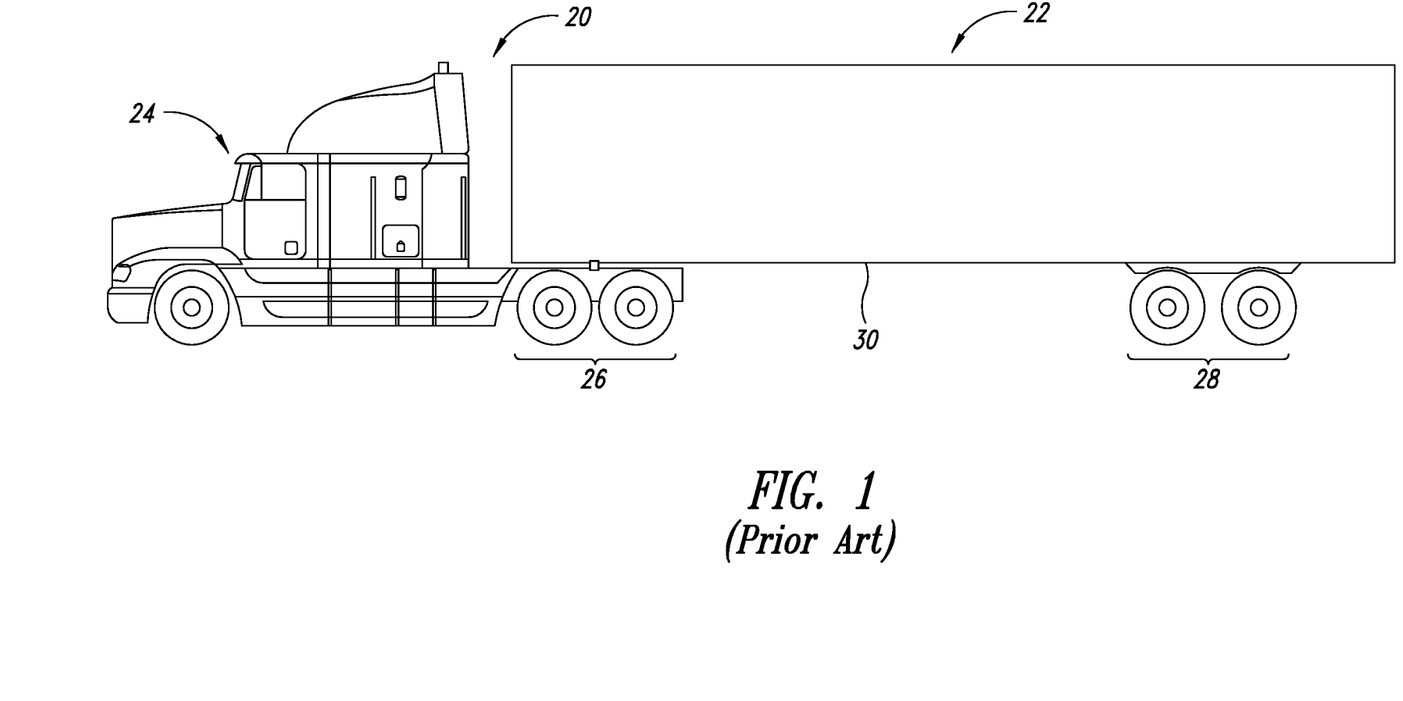
FIG. 1 is a right side elevational view of a known trailer without fairings.

Tractor-trailer combinations or "semi-trucks" have been utilized for the haulage of freight for many years. For example, referring to FIG. 1, illustrated therein is an elevational view of a known tractor-trailer combination 20 including a tractor 24 coupled to a trailer 22. The tractor 24 includes at least one pair of first wheels 26 and the trailer 22 includes at least one pair of second wheels 28. As is known, the at least one pair of second wheels 28 are part of a longitudinally adjustable trailer wheel assembly, referred to at times as a bogie, wherein the position of the second pair of wheels 28 can be adjusted longitudinally relative to the tractor 24 in order to achieve proper load distribution. As illustrated, the tractor-trailer combination 20 does not have fairings extending from a lower outer edge 30 of the trailer 22 between the at least one pair of first wheels 26 of the tractor 24 and the at least one pair of second wheels 28 of the trailer.

Figure 2:
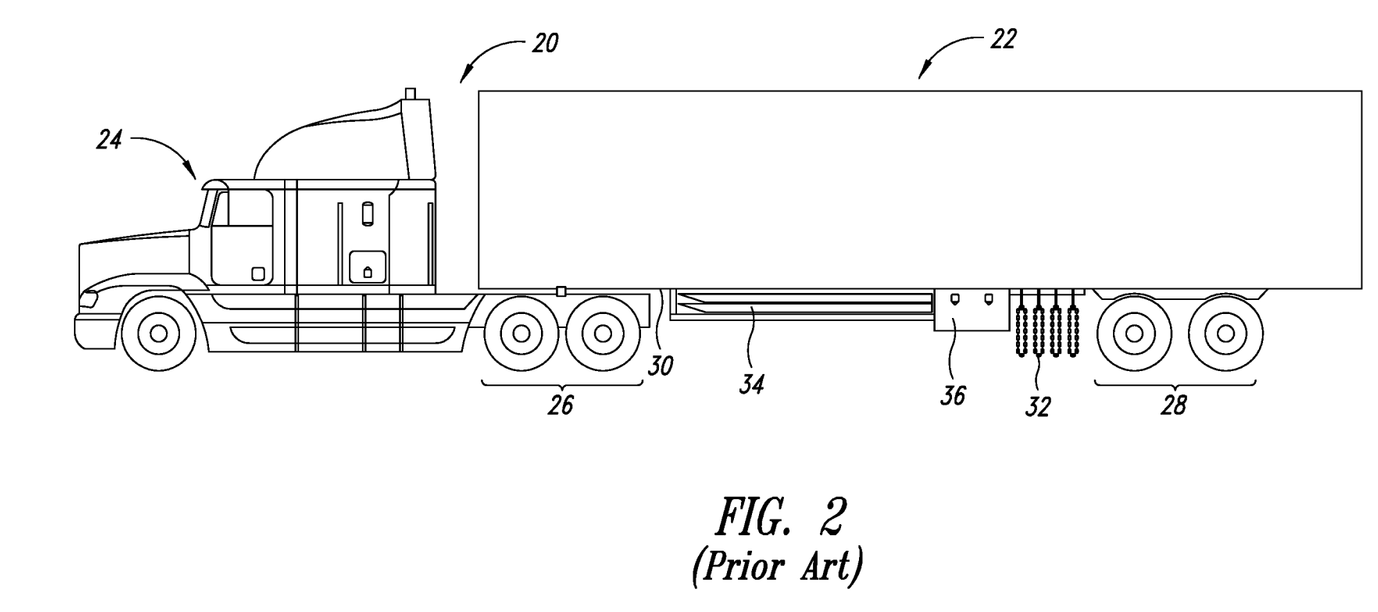
FIG. 2 is a view of an underbody of a known trailer housing a chain hanger, a ramp, and a toolbox.

FIG. 2 is a side elevational view of the known tractor-trailer combination 20 including the tractor 24 coupled to the trailer 22 wherein one or more tools 32, 34, 36 are coupled to the trailer 22 adjacent the outer edge 30 and between the at least one pair of first wheels 26 and the at least one pair of second wheels 28. For example, the tools can include a chain hanger 32, a ramp 34, and a toolbox 36. Such items are commonly stored below the trailer 22 and adjacent the outer edge 30 between the wheels 26, 28.

Such tractor-trailer combinations suffer from significant aerodynamic losses under and around the trailer. Further, because there is a large distance between the driving surface and the outer edge of the trailer, it is very easy for objects to roll under the trailer and come into contact with the pair of second wheels 28, or rear wheels, thus creating a significant safety risk for objects that are near the tractor-trailer combination as well as the wheels 28 while it is in motion. In light of these issues, it is known that fuel economy can be improved in the haulage of trailers by utilizing fairings mounted beneath each of the trailer's lower, outer longitudinal edges in front of a longitudinally adjustable trailer wheel assembly. However, existing fairings suffer from several defects.

Figure 3:
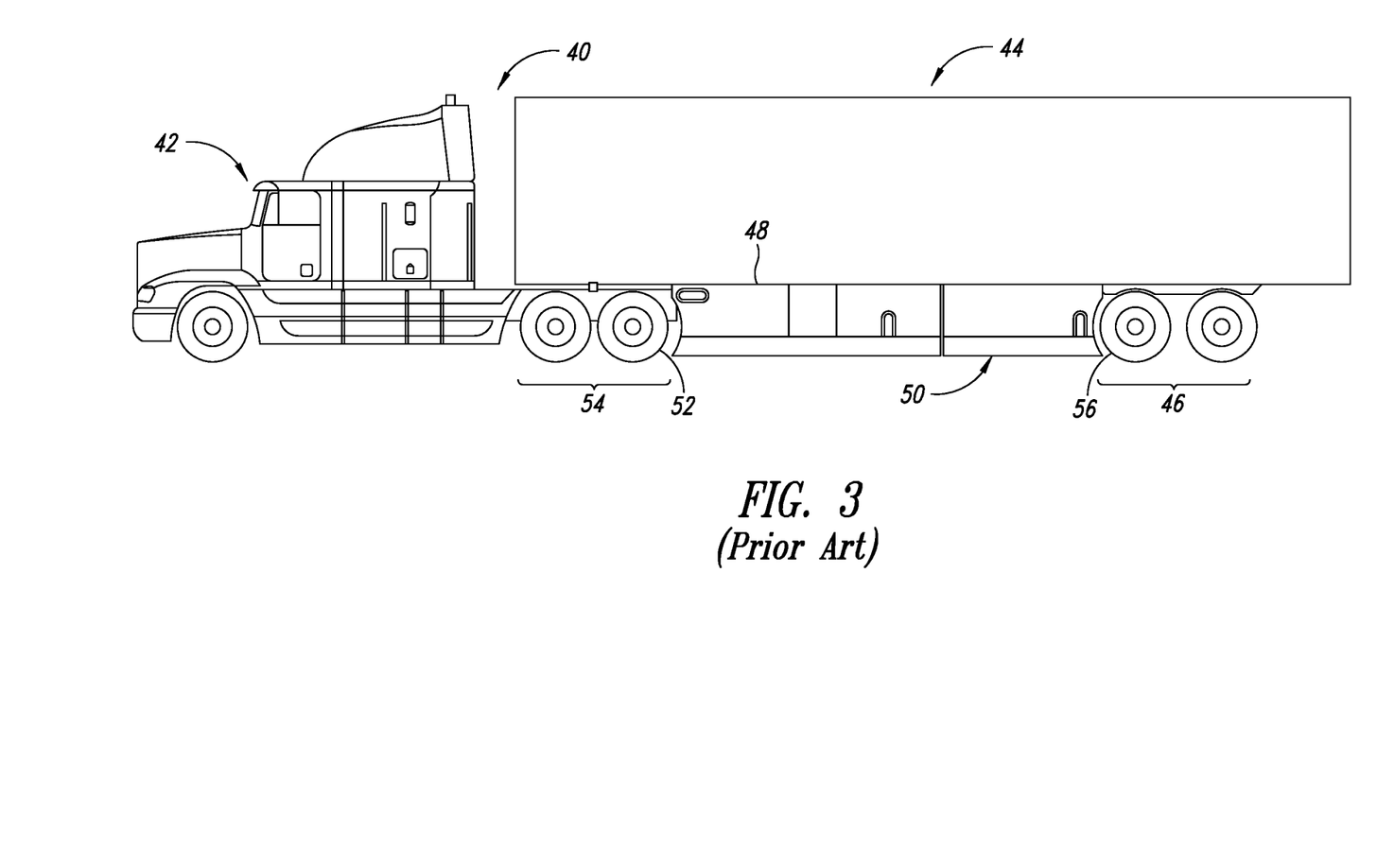
FIG. 3 is a right side elevational view of a known trailer having a slidable fairing movable between an open position and a closed position.

For example, U.S. Pat. No. 6,644,720 ("the '720 patent") describes fairings that do not extend beyond the trailer wheel assemblies. An example of a known tractor-trailer combination 40 of the type disclosed in the '720 patent is illustrated in FIG. 3. The tractor-trailer combination 40 includes a tractor 42 coupled to a trailer 44 that includes a second pair of wheels 46 and a lower, longitudinal outer edge 48. A fairing 50 is attached to the outer edge 48 of the trailer 44. The fairing 50 has a length that extends from a location proximate an outer edge 52 to a pair of first wheels 54 of the tractor 42 to a location proximate an outer edge 56 of the pair of second wheels 46. The pair of second wheels 46 is part of a longitudinally adjustable trailer wheel assembly 58 or bogie that is movable between multiple positions along the trailer 44 relative to the tractor 42, as noted above.

To accommodate the movement of the wheel assembly 58, the fairing 50 includes sliding panels, such that when the trailer wheel assembly 58 is moved to a different position relative to the tractor 42, the fairing 50 is similarly extended or shortened a corresponding amount. Further, the fairing 50 is movable between an open position for accessing the underbody of the trailer 44 and a closed position, as illustrated, for reducing aerodynamic losses while the tractor-trailer combination 40 is in motion. Notably, however, the fairing 50 does not extend beyond the outer edge 56 of the pair of second wheels 46 and, thus, does not extend beyond the trailer wheel assembly 58.

In other words, in known tractor-trailer combinations, the trailer wheel assembly and the underside of the trailer behind the trailer wheel assembly are exposed, regardless of the fairing position. Trailers with these exposed areas suffer from aerodynamic losses that lead to lower fuel efficiencies because the exposed areas create drag that undermines the positive effect of the fairing. Existing fairings also do not accommodate longitudinal adjustment of the trailer wheel assembly while maximizing fuel efficiency. While the '720 patent, as represented by FIG. 3, describes an adjustable fairing to make repositioning the trailer wheel assembly easier, the fairing in the '720 patent still suffers from reduced fuel economy because the trailer wheel assemblies and the area of the trailer behind the trailer wheel assemblies are exposed, as explained above.

Existing fairings also pose a safety threat to others who are in the driving area of the trailer when it is pulled by a tractor, or truck. Because existing fairings do not extend to cover the trailer wheel assemblies, persons and other objects are at risk of serious and potentially life-threatening injury if they come into contact with the trailer wheel assemblies while the trailer is in motion. Further, many fairings extend only a short distance from the outer longitudinal edges of the trailer, such that a large gap is created between a lower edge of the fairing and the driving surface. Not only does this result in decreased fuel efficiency due to aerodynamic losses, this is a particular safety concern because the large gap allows the trailer to easily roll over objects when an accident occurs, whether on the highway or in a populated area.

It is also common for the driver of a truck pulling a trailer to need access to the underside of the trailer. For example, as noted above, a typical trailer may have landing gear, spare tires, chains, ramps and tool boxes all stored below the underside of the trailer. In addition, a driver may need access to the underside for maintenance, pinning the tandem slide, or for accessing the reefer tank. Border inspections also commonly include inspection of the underside of the trailer. However, many existing fairings commonly block access to underside of the trailer and, thus, must be removed in order to access the underside of the trailer. This makes accomplishing the above tasks, or accessing such materials and tools, more difficult and time consuming for the driver of the trailer.

BRIEF SUMMARY

In accordance with the present disclosure, a fairing for use on a trailer having an underbody extending between a front portion and a rear portion of the trailer is provided. A wheel bogie assembly is mounted on the underbody and includes a forward set of wheels with a forward termination point and a rear set of wheels with a rear termination point. The fairing further includes first and second frame members coupled to the trailer, with the second frame member spaced from the first frame member. A plurality of panels are coupled to the first and second frame members, the plurality of panels having a longitudinal length that extends from at least the forward termination point of the wheel bogie assembly to at least the rear termination point of the wheel bogie assembly. The fairing is movable between an open position that provides access to the underbody of the trailer and a closed position in which the fairing overlies the wheel bogie assembly.

In accordance with one aspect of the present disclosure, the fairing includes a latch coupled to one of the plurality of panels having an engaged and a disengaged position, wherein when the latch is in the engaged position the latch secures the fairing in the closed position. The second frame member can also include a peripheral edge, with the fairing further including a skirt extending along, and away from, the peripheral edge. The skirt further includes an outer edge spaced from a driving surface when the fairing is in the closed position and in an aspect, the space is four inches.

In accordance with yet another aspect of the present disclosure, the skirt is substantially flat and planar and comprised of a flexible material.

In accordance with a further aspect of the present disclosure, a first one of the plurality of panels is telescopically received behind a second one of the plurality of panels. Further, the longitudinal length of the plurality of panels can extend from the front portion of the trailer to the rear portion of the trailer and beyond the rear termination point of the bogie wheel assembly.

In accordance with another aspect of the present disclosure, a trailer to be pulled by a tractor having a first rear set of wheels is provided. The trailer includes an underbody and a bogie assembly mounted on the underbody that is movable between a forward position and a rear position relative to a first rear set of wheels of the tractor, the bogie assembly including a rear outermost longitudinal edge. A second rear set of wheels are coupled to the bogie assembly and include an outermost radial edge. A first stanchion is coupled the trailer and a second stanchion is coupled to the trailer behind the rear outermost longitudinal edge of the bogie assembly when the bogie is in the rear position.

The trailer further includes a hinge coupled to the trailer between the first stanchion and the second stanchion, the hinge having a size and a shape to provide a space between an outermost edge of the hinge and the outermost radial edge of the second rear set of wheels. In an aspect, the space is between 3 and 5 inches when the trailer is in an unloaded condition. A fairing is then coupled to the first stanchion, the second stanchion, and the hinge, the fairing having a longitudinal length that extends from at least from the first portion of the trailer to the second stanchion. The fairing is movable between an open position that provides access to the underbody of the trailer and a closed position in which the fairing overlies the bogie assembly.

In accordance with yet another aspect of the present disclosure, the first stanchion and the second stanchion each include a loading block and the fairing includes a complimentary slide block for each loading block, each slide block engaging a respective one of the loading blocks to secure the fairing in the closed position. Ideally, each slide block is associated with a latch movable between an engaged position and a disengaged position, in which in the engaged position, the latch slide block engages a complimentary loading block to secure the fairing in the closed position.

In accordance with still yet another aspect of the present disclosure, a third stanchion and a fourth stanchion are coupled to the trailer between the first and second stanchions with the fairing coupled to the first, second, third, and fourth stanchions. Ideally, a lift support is coupled between each of the first and second stanchions and the fairing to hold the fairing in the open position. The trailer can further include the longitudinal length of the fairing extending beyond the second stanchion.

As will be readily appreciated from the foregoing, the present disclosure avoids the disadvantages of prior faring and trailer designs by providing a fairing that accommodates longitudinal adjustment of the trailer wheel assemblies while maximizing aerodynamic flow of air around the trailer and increasing safety to objects and people that encounter the trailer while it is in motion while also providing easy access to the underbody of the trailer for maintenance, inspection, and accessing materials stored under the trailer.

BRIEF DESCRIPTION OF THE SEVERAL VIEWS OF THE DRAWINGS

The foregoing features and advantages of the present disclosure will be more readily appreciated as the same become better understood from the following detailed description when taken in conjunction with the accompanying drawings wherein.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures or components or both associated with trailer fairings as well as manufacturing processes for the same have not been shown or described in order to avoid unnecessarily obscuring descriptions of the implementations.

Throughout the detailed description, the word "bogie" is used to describe a device containing one or more axles and for each axle, a pair of hubs for receiving wheels, wherein the device is mounted to an underbody of a trailer for supporting the trailer and is also adjustable along a longitudinal direction with respect to the trailer. Such bogies are also commonly termed "trucks" in the long-haul trucking industry. It is to be appreciated that these terms may be used interchangeably in reference to the above definition. Further, the word "hinge" is used to refer to a mechanical bearing for connecting two objects that allows for angular rotation between the objects in at least one degree of freedom. The term "stanchion" as used herein refers generally to a support member positioned in any orientation and consisting of one or more frame elements.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one implementation" or "an implementation" means that a particular feature, structure, or characteristic described in connection with the implementation is included in at least one implementation. Thus, the appearance of the phrases "in one implementation" or "in an implementation" in various places throughout the specification are not necessarily all referring to the same implementation. Furthermore, the particular features, structures, or characteristics may be combined in any suitable manner in one or more implementations.

Figure 4:
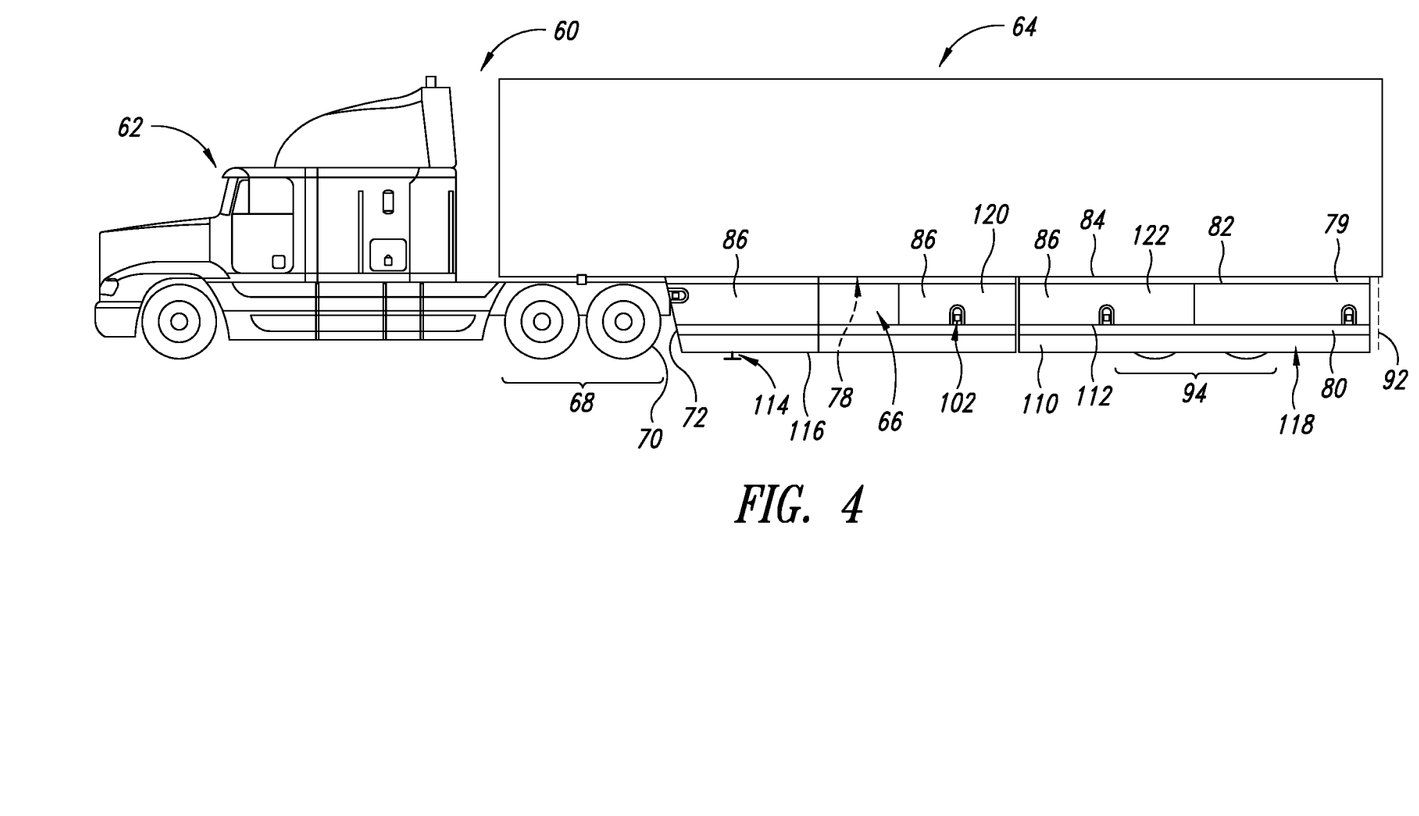
FIG. 4 is a left side elevational view of a fairing formed in accordance with the present disclosure illustrated in a closed position.
Figure 5:
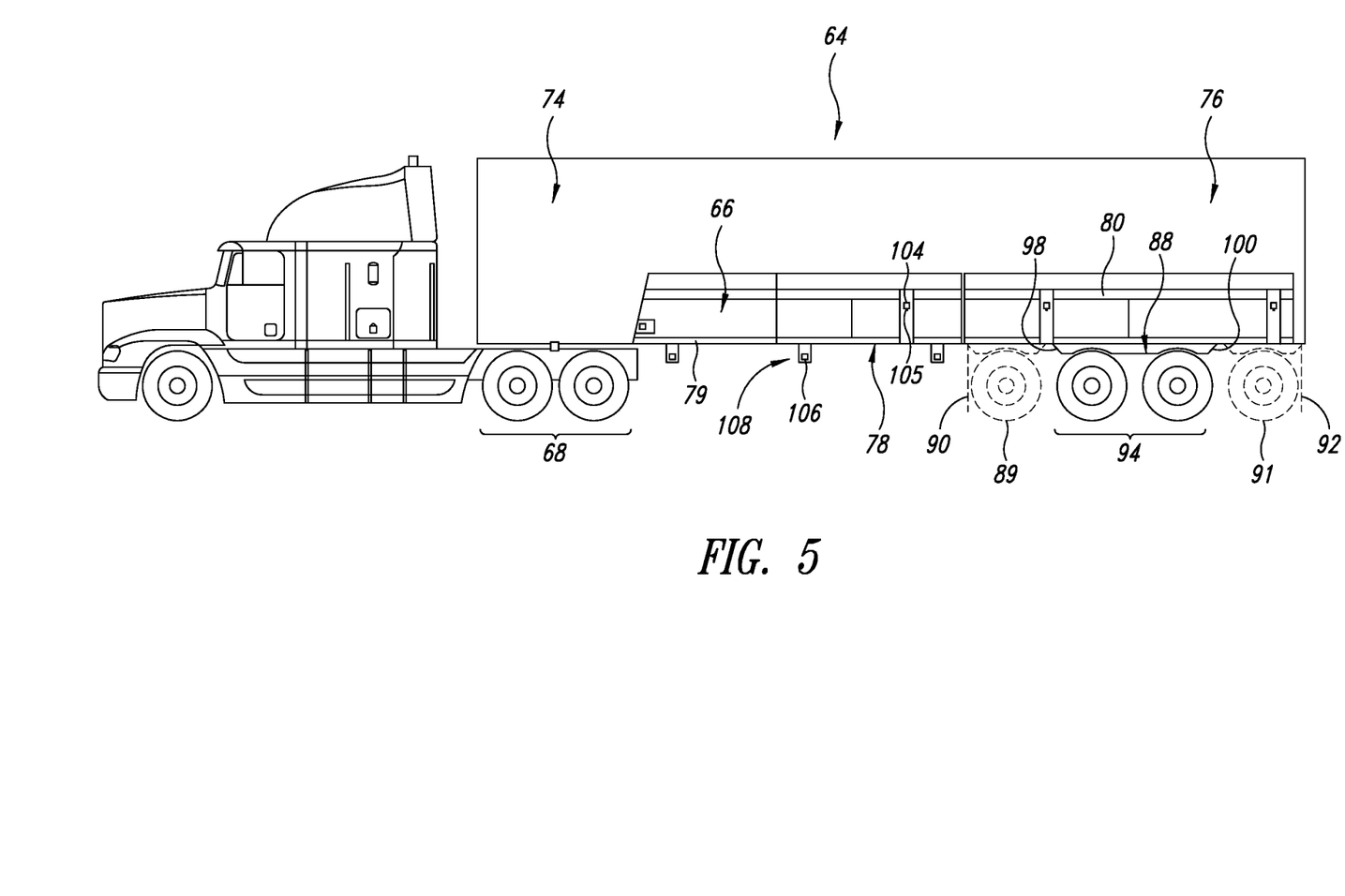
FIG. 5 is a left side elevational view of a fairing formed in accordance with the present disclosure illustrated in an open position.

A tractor-tractor combination 60 having a fairing 66 formed in accordance with the present disclosure is shown in FIG. 4 and FIG. 5. In FIG. 4, a tractor-trailer combination 60 is shown having a tractor 62 coupled to a trailer 64 and the fairing 66 attached to the trailer 64, which is illustrated in a closed position. In FIG. 5, the fairing 66 is illustrated in an open position that provides access to the underbody 78 of the trailer 64. As will be explained in more detail below, the fairing 66 is movable between the closed position illustrated in FIG. 4 and the open position illustrated in FIG. 5.

The tractor 62 includes at least one pair of first wheels 68, which in an implementation, are a rear set of wheels of the tractor 62 in a tandem arrangement, wherein each of the at least one pair of first wheels 68 has an outer radial edge 70. The outer edge 72 of the fairing 66 is positioned proximate the outer radial edge 70 of the wheels 68 when the fairing is in the closed position in order to reduce aerodynamic losses. In other words, when the fairing 66 is in the closed position, the fairing 66 overlies the wheel bogie assembly 88 such that a bystander viewing the truck 60 in the orientation shown in FIG. 4 would not be able to see the wheel bogie assembly 88, except for a portion of second wheels 94 exposed by gap or space 114, as described herein and illustrated in FIG. 4.

The trailer 64 further includes a front portion 74 and a rear portion 76, and an underbody 78 extending from the front portion 74 to the rear portion 76 of the trailer 64. The trailer 64 also includes at least one pair of second wheels 94 coupled to a bogie 88, which collectively may be referred to as a wheel bogie assembly 88 (shown in FIG. 5). The at least one pair of second wheels 94 similarly have an outermost radial edge. The bogie 88 is mounted on, or coupled to, the trailer underbody 78. As noted above, the bogie 88 is movable or slidable relative to the tractor 62 between a forward position and a rear position. In other words, the underbody 78 of the trailer 64 includes known devices for sliding the bogie 88 between various positions, with each position aligning with a corresponding one of a plurality of tandem holes (not shown) on the underbody 78 of the trailer 64 for securing the bogie 88 to the trailer 64 in a selected position. The forward position corresponds to a first position that is closest to the tractor 62 and the rearward position corresponds to a second position that is furthest from the tractor 62. A plurality of tandem holes (not shown) can be used to secure the bogie 88 in position on the trailer 64. Because the spacing between the plurality of tandem holes (not shown) may vary depending on the implementation of the trailer 64, in certain implementations, the plurality of tandem holes includes 10 or more tandem holes, 20 or more tandem holes, 30 or more tandem holes, or 40 or more tandem holes.

The forward position of the bogie 88 is represented by dashed lines 89 in FIG. 5, which indicate a forward most position of the at least one pair of second wheels 94 when the wheel bogie assembly 88 is in its maximum forward location relative to the tractor 62 for normal and safe operation of the tractor-trailer combination 60. One of skill in the art will appreciate that in certain implementations, the forward position does not necessarily correspond to the tandem hole (not shown) that is closest to the tractor 62 along the underbody 78 of the trailer 64 because the trailer 64 may include tandem holes that have been welded closed at this location, or may include a stop bar (not shown) to prevent operation of the trailer with the bogie 88 in a position that is too far forward for safe operation. As such, in certain implementations, the forward position, as indicated by dashed lines 89, may correspond to a first tandem hole, which is the closest tandem hole to the tractor 62, or a second tandem hole, or a third, fourth, fifth, or sixth tandem hole, among others.

The rear position is represented by second dashed lines 91, which indicate a rearward most position of the at least one pair of second wheels 94 when the wheel bogie assembly 88 is in its maximum rearward location relative to the tractor 62. Similar to the above discussion regarding the forward position, the rear position corresponds to a maximum rearward location of the wheel bogie assembly 88 relative to the tractor 62 for normal and safe operation. In certain implementations, the rear position corresponds to the last tandem hole furthest from the trailer 64, while in other implementations, the rear positions corresponds to a second to last, third to last, fourth to last, fifth to last, or sixth to last tandem hole, among others.

The wheel bogie assembly 88 includes a forward termination point 90, which is a plane that includes a front longitudinal edge 98 of the bogie 88 when the bogie 88 and the at least one pair of second wheels 94 are in the forward position. The bogie 88 further includes a rear termination point 92, which is a plane that includes a rear outermost longitudinal edge 100 of the bogie 88 when the bogie 88 is in the rear position.

The fairing 66 extends from the front portion 74 to the rear portion 76 of the trailer 64. The fairing 66 further includes a first frame member 79 coupled to the trailer 64. In the implementation shown in FIG. 4, the first frame member 79 extends along a length of the fairing 66, or in other words, extends along a length of an upper longitudinal edge 82 of the fairing 66 and adjacent a lower longitudinal edge 84 of the trailer 64 when the fairing 66 is coupled to the trailer 64. The fairing 66 also includes a second frame member 80 coupled to the trailer 64 via a plurality of panels 86. The second frame member 80 is spaced from the first frame member 79, with the plurality of panels 86 coupled therebetween. Each of the plurality of panels 86 are coupled on a first edge to the first frame member 79 and on a second edge to the second frame member 80.

As shown more clearly in FIG. 4, the plurality of panels 86 have a longitudinal length that extends to at least the rear termination point 92 of the wheel bogie assembly 88. Preferably, the longitudinal length of the fairing 66 extends from a location proximate the at least one pair of first wheels 68 to a location beyond the rear termination point 92 of the wheel bogie assembly 88. In other words, the longitudinal length of the plurality of panels 86 preferably extends from the front portion 74 of the trailer 64 to the rear portion 76 of the trailer 64 and beyond the rear termination point 92 of the wheel bogie assembly 88. Further, in the closed position illustrated in FIG. 4, the fairing 66 overlies the wheel bogie assembly 88. In other words, when the fairing 66 is in the closed position, the wheel bogie assembly 88 is not visible when viewing the trailer 64 from the side. Further, one of skill in the art will appreciate that although only one fairing 66 is illustrated for purposes of simplicity and brevity, the trailer 64 preferably includes a second fairing (not shown) on the other side of the trailer 64 as well, in order to increase aerodynamic efficiencies on both sides of the trailer.

Figure 7:
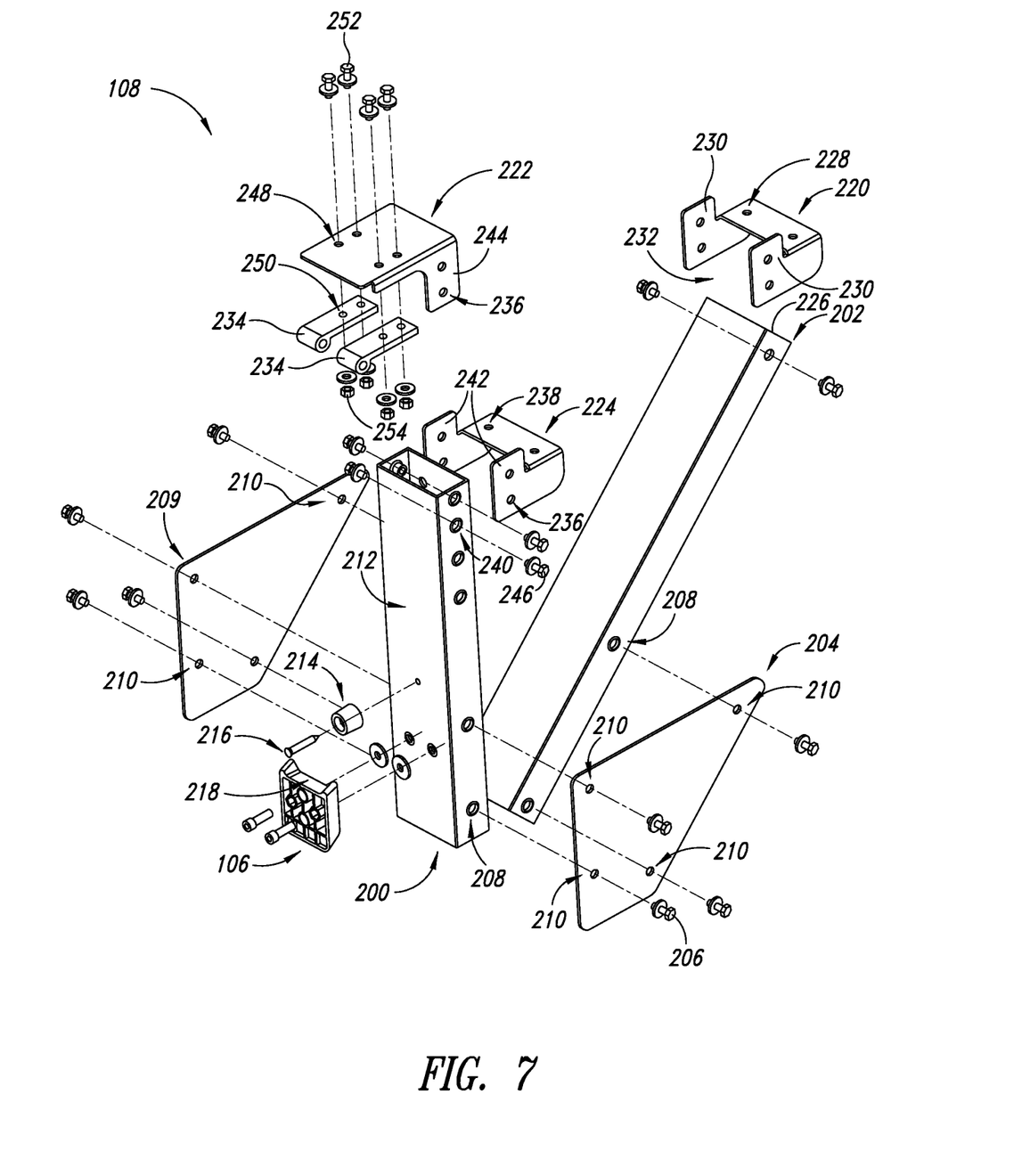
FIG. 7 is an exploded view of a stanchion for coupling a fairing to a trailer formed in accordance with the present disclosure.

The fairing 66 can further include a latch 102 that is coupled to one of the plurality of panels 86 and moveable between an engaged position and a disengaged position along a channel 105. The engaged position is illustrated in FIG. 4 when the fairing 66 is in the closed position. The disengaged position is illustrated in FIG. 5 when the fairing 66 is moved from the closed position to the open position. When the latch 102 is in the engaged position, a slide block 104 coupled to or associated with the latch 102 engages a loading block 106 on a stanchion 108 coupled to the underbody 78 of the trailer 64 as shown in FIG. 7 and described more fully below. Moreover, although not specifically illustrated, it is to be appreciated that the fairing 66 and the trailer 64 can include one or more lift supports, which may be a hydraulic actuator, for example, coupled between the fairing 66 and the trailer 64 to assist a user in lifting the fairing 66 between the open and closed positions described herein.

In operation, a user lowers the fairing 66 from the open position to the closed position, and moves the latch 102 from the disengaged position to the engaged position, wherein moving the latch 102 includes engaging the slide block 104 with the loading block 106 of the stanchion 108 to secure the fairing 66 in the closed position. When the latch 102 is in the engaged position and the fairing 66 is in the closed position, the latch 102 secures the fairing 66 in the closed position. The latch 102 limits rotational movement of the fairing 66 such that the fairing 66 cannot rotate from the closed position to the open position when the latch 102 is in the engaged position.

In this implementation, the second frame member 80 includes a peripheral edge 112 and the fairing 66 further includes a skirt 110. The skirt 110 extends along, and away from the peripheral edge 112. The skirt 110 preferably extends along the entire length of the second frame member 80 at the peripheral edge 112, however, in other, alternative implementations, the skirt 110 extends only along a portion of the peripheral edge 112 of the second frame member 80. Further, the skirt 110 preferably extends away from the peripheral edge 112 such that a gap or space 114 is formed between an outer edge 116 of the skirt 110 and a driving surface (not shown) when the fairing 66 is in the closed position. In various implementations, the gap or space 114 includes a gap or space of 1 inch or less, 2 inches or less, 3 inches or less, 4 inches or less, 5 inches or less, or 6 inches or less. The skirt 110 preferably has a first, or front, surface 118 that is substantially flat and planar, although one of skill in the art will appreciate that the first surface 118 may also be curved toward or away from the trailer 64. Moreover, the skirt 110 is preferably formed of a flexible material, such as various polymers, rubbers, plastics, or combinations thereof.

As will be explained in more detail below, the plurality of panels 86 includes a first panel 120 of the plurality of panels 86 received behind a second panel 122 of the plurality of panels 86, preferably in telescopic fashion. As such, the telescopic nature of the panels 86 allows a user to access certain tools or materials, as noted above, that are commonly stored adjacent the underbody 78 of the trailer 64 without having to move the entire fairing 66 to the open position. Further, in this implementation, the telescopic panels 120, 122 allow the fairing 66 to adjust in size, such that the fairing 66 can be used on a wider variety of tractor-trailer combinations, each with different lengths, without having to change the design of the fairing 66 or remove panels 86.

Figure 6:
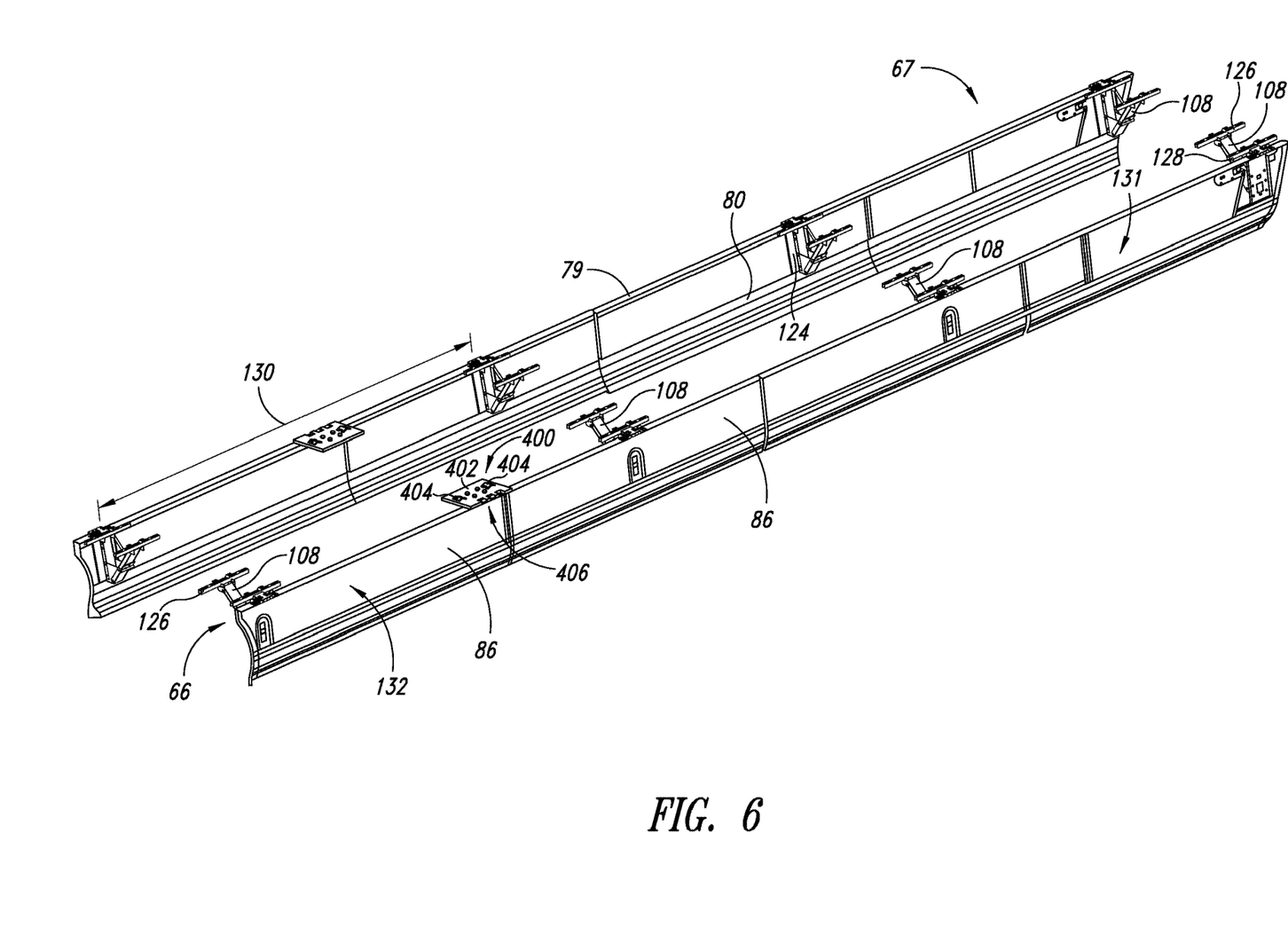
FIG. 6 is an axonometric view of opposing left and right fairings formed in accordance with the present disclosure illustrated unmounted from a trailer.

In FIG. 6, the fairing 66 is illustrated as detached from a trailer (such as trailer 64 in FIG. 5) and in the closed position in order to provide additional detail regarding the fairing 66 and the coupling to the trailer (not shown). FIG. 6 also illustrates that the implementations of the present disclosure include the fairing 66 being a first fairing, with a second fairing 67 provided opposite the first fairing 66, such that a fairing is coupled to each side of the trailer (not shown) in order to increase aerodynamic efficiencies on both sides of the trailer (not shown). In an aspect, the first fairing 66 and the second fairing 67 are substantially similar, while in other aspects each fairing 66, 67 includes different features or aspects. For simplicity, the remaining discussion of the fairings of the present disclosure will proceed with respect to fairing 66, which may be the first fairing, although one of skill in the art will appreciate that the second fairing 67 can include some, or all, of the aspects of fairing 66.

The fairing 66 in FIG. 6 includes the plurality of panels 86 coupled to the first frame member 79 and the second frame member 80. Ideally the first frame member 79 is a 2 inch by 1 inch aluminum angle, although other materials and support members may be used. At least one stanchion 108 is coupled to the fairing 66. In one implementation, the at least one stanchion 108 is substantially similar to the stanchion 108 in FIG. 7. Each of the at least one stanchions 108 is coupled to the fairing at a stanchion support member 124, which is more clearly illustrated with respect to the second fairing 67 and with reference to FIG. 5. Each stanchion support member 124 preferably extends between the first frame member 79 and the second frame member 80. In addition, each stanchion 108 may include one or more coupling bars, such as first coupling bar 126 and second coupling bar 128, which have a size and a shape to couple with the first and second brackets 220, 222, respectively, as shown in FIG. 7. Then, bolts or other fasteners or securing means are used to couple the coupling bars 126, 128 to the underbody of the trailer (such as underbody 78 of trailer 64 in FIG. 5). Either a fixed or adjustable mounting may be used. More specifically, the coupling bars 126, 128 are preferably coupled to one or more I-beams on the underbody of the trailer. Alternatively, the coupling of the coupling bars 126, 128 includes welding the coupling bars 126, 128 to the trailer I-beams on the underbody. In other aspects, the stanchions 108 are provided without coupling bars 126, 128, such that the first and second brackets 220, 222 (FIG. 7) of each stanchion are coupled to the underbody of the trailer directly, either through welding, bolts, brackets, or other means.

Further, the fairing 66 includes a hinge 400. The hinge 400 is coupled to the fairing 66, preferably between two stanchions 108 at a location that is proximate the second set of wheels 94 (FIG. 5) when the fairing 66 is coupled to the trailer (not shown). The hinge 400 includes a body 402 and a pair of brackets 404 that are positioned, located, and, or, oriented on the body 402 of the hinge 400 to couple with flanges of I-beams on the underbody of the trailer (not shown). Further, the hinge 400 includes a barrel and pin combination 406, such that the fairing 66 can be rotated in at least one degree of freedom about the barrel and pin combination 406.

In an aspect, the fairing 66 includes four stanchions 108 and at least one hinge 400 with the body 402 of the hinge 400 being substantially flat and planar, as illustrated in FIG. 6. Although not necessarily drawn to scale, in an implementation, a distance 130 between a first stanchion 108 proximate a front portion 131 (i.e. proximate the forward termination point of the wheel bogie assembly 88) of the fairing 66 and the next successive stanchion 108 is 16 feet, wherein the stanchion 108 is located proximate a rear portion 132 of the fairing 66 (i.e. proximate, or just behind, the rear termination point of the wheel bogie assembly 88). Also, a length of the fairing 66 between its outermost edges is 22 feet. The hinge 400 is positioned approximately 8 feet (i.e. within 7 to 9 feet), or mid-span, between the two stanchions described above and spaced by distance 130, although it is to be appreciated that the hinge 400 can be located anywhere along the span or distance 130 between successive stanchions.

Alternatively, although not specifically shown, the hinge 400 may be located mid-span between any of the stanchions 108 along the fairing in order to provide additional support for coupling the fairing 66 to the trailer (not shown). Because the body 402 of the hinge 400 is substantially flat and planar, the hinge 400 can be positioned proximate a pair of wheels of the trailer (not shown) without interfering with the wheels or proximate the wheel bogie assembly 88 without interfering with an outer radial edge of the at least one pair of second wheels 94. In other words, when fairing 66 is mounted to the trailer (not shown), there is a gap or space between an outer surface of the hinge 400 and an outermost radial edge of the pair of wheels (not shown, but may be substantially similar to the second set of wheels 94 coupled to the wheel bogie assembly 88). In an implementation, the gap or space is between 3 to 5 inches, or more preferably is 4 inches or approximately 4 inches (i.e. between 3.75 and 4.25 inches) when the trailer 64 is an unloaded condition (i.e. is not carrying a load or any cargo within the trailer 64).

In yet a further alternative implementation, the fairing 66 and trailer 64, generally, include a first, second, third and fourth stanchion, which each may be substantially similar to stanchion 108. The first stanchion 108 is coupled to the trailer 64 proximate the first or front portion 131 of the fairing 66 and the second stanchion 108 is coupled to the trailer proximate the second or rear portion 132 of the fairing 66. The hinge 400 is coupled to the trailer 64 between the first and second stanchions 108 and has a size and a shape to provide a space between an outermost edge of the hinge 400 and the outermost radial edge of the rear wheels 94 of the bogie assembly 88, as described herein. The fairing 66 is coupled to the first and second stanchions 108 and the hinge 400 with a longitudinal length that extends at least from the first portion 131 to the second stanchion 108 proximate the rear portion 132. The third and fourth stanchions 108 are coupled to the trailer 64 between the first and second stanchions 108 and coupled to the fairing 66 to provide further support for the fairing 66 given its extended length. Further, while FIG. 6 illustrates only one hinge 400, it is to be appreciated there may be more than one hinge 400 spaced along the longitudinal length of the fairing 66 (or fairing 67), including more than one hinge between each pair of successive stanchions 108 in certain implementations. Accordingly, the present disclosure is not limited by the number or placement of the hinges 400 relative to the stanchions.

Accordingly, when the hinge 400 is positioned proximate the bogie 88 (FIG. 5) or the at least one pair of second wheels 94 coupled to the bogie 88 (FIG. 5) and the bogie 88 and/or the at least one pair of second wheels 94 are movable relative to the trailer (not shown) between the plurality of tandem holes (not shown), the size and shape of the hinge 400 prevents interference with the wheels 94 (FIG. 5) when the wheels 94 (FIG. 5) are in motion, or are in the process of sliding between tandem holes (not shown). Further, because the hinge 400 is preferably coupled to the fairing 66 mid-span between stanchions 108, the hinge 400 provides support to the fairing 66 such that the fairing 66 can be extended to substantially cover the at least one pair of second wheels 94 (FIG. 5) as described herein. In other words, the hinge 400 is operative to help enable extension of the fairing 66 as described in various implementations of the present disclosure.

It is to be further appreciated that because the fairing 66 may have various sizes or lengths in various applications, the fairing 66 can include more or less stanchions 108 than as illustrated, in addition to other support members that are not illustrated, such as singular hinges (not shown) that are not associated with stanchions.

Referring next to FIG. 7, illustrated therein is an exploded view of the stanchion 108 for coupling the fairing 66 (FIG. 4-5) to the trailer 64 (FIG. 4-5). The stanchion 108 includes a first beam or support member 200 and a second beam or support member 202. The first and second beams 200, 202 include a plurality of first holes 208. The first beam 200 is coupled to the second beam 202 via a pair of gusset plates 204. Each of the pair of gusset plates 204 includes a plurality of second holes 210, wherein each of the plurality of second holes 210 aligns with a corresponding one of the plurality of first holes 208 on the beams 200, 202. Each of a plurality of bolts 206 are sized and shaped to be inserted through a corresponding one of the plurality of second holes 210 and a corresponding one of the plurality of first holes 208, wherein the plurality of first holes 208 include threads or other securing mechanism (not shown) and each of the plurality of first bolts 206 include a corresponding threading or securing mechanism. As such, each of the plurality of bolts 206 are tightened through a corresponding one of the plurality of first holes 208 in order to secure the gusset plates 204 and the beams 200, 202 together.

The loading block 106 is coupled to a first surface 212 of the first beam 200 in a similar manner. In an implementation, the stanchion 108 includes a stopper 214 coupled to the first surface 212 with a pin 216 proximate a surface 218 of the loading block 106. The stopper 214 preferably comprises an elastic material, such as rubber, in order to provide a cushion for the fairing 66 when it is lowered into the closed position. The stopper 214 further preferably provides for dissipation of vibrational forces that would otherwise resonate from the wheels 68, 94, through the trailer 64 and to the fairing 66. In such a situation, these vibrational forces could cause stress and strain damage that will lead to failure of the loading block 106, the slide block 104, or the stanchion 108 through repeat cycles of use. However, the stopper 214 is useful in preventing the same.

As illustrated in FIG. 7, the loading block 106 further includes a first bracket 220, a second bracket 222, and a third bracket 224. The first bracket 220 is coupled to an end 226 of the second beam 202 and includes a plurality of second holes 228 for coupling the first bracket 220 to the underbody 78 (FIG. 5) of the trailer 64. The first bracket 220 further includes a pair of flanges 230 that are spaced from one another. In other words, the pair of flanges 230 are separated by a space or gap 232. One of skill in the art will appreciate that the space or gap 232 has a size and a shape to facilitate mounting of the flanges 230 to an I-beam on the underbody 78 (FIG. 5) of the trailer 64 (FIG. 5). As such, bolts can be inserted through the holes 228 for securing the first bracket 220 to the I-beam.

The second bracket 222 and the third bracket 224 preferably cooperate to couple the first beam 200 to the trailer 64 (FIG. 5) as well as to a pair of first barrels 234. The second bracket 222 and the third bracket 224 each include a plurality of third holes 236 that align with receiving holes 240 in the first beam 200. In other words, flanges 242 of the third bracket 224 and flanges 244 of the second bracket 222 overlap, and a plurality of second bolts 246 are inserted through the aligned plurality of third holes 236 to secure the second and third brackets 222, 224 to the first beam 200. The third bracket includes a plurality of fourth holes 238 that can be coupled to an I-beam of the trailer 64 (FIG. 5) as noted above. The second bracket 222 further includes a plurality of fifth holes 248 that align with a plurality of sixth holes 250 on each of the pair of first barrels 234. Each of a plurality of third bolts 252 are inserted through a corresponding one of the plurality of fifth and sixth holes 248, 250 and are secured by nuts 254.

Although not specifically illustrated in FIG. 7, one of skill in the art will further appreciate that the fairing 66 includes a pair of second barrels coupled to the fairing 66, and preferably to the first frame member 79, and positioned to align with the pair of first barrels 234, such that a pin (not shown) can be inserted through the respective pairs of barrels, thus coupling the fairing 66 to the trailer 64, while also allowing the fairing 66 to rotate in one degree of freedom about the pair of barrels 234. In other words, the pair of first barrels 234 coordinates with a pair of second barrels and a pin to form a hinge, thus allowing the fairing 66 to move between the closed position and the open position.

Figure 8:
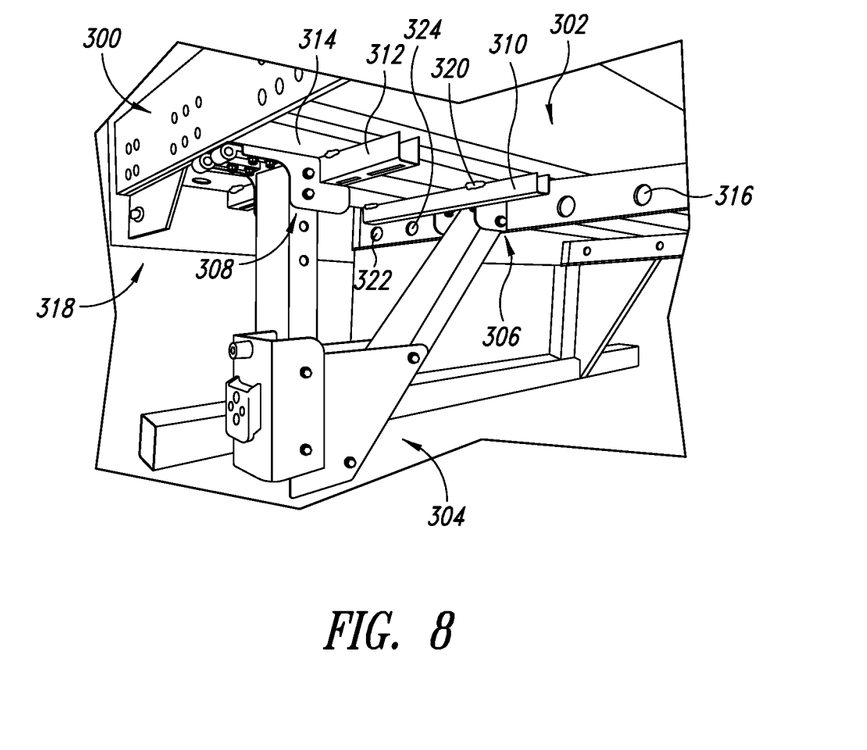
FIG. 8 is a view of a stanchion mounted behind rear wheels of a trailer.

FIG. 8 illustrates a stanchion 304, which in one implementation is substantially similar to stanchion 108 described above with reference to FIG. 7. The stanchion 304 is coupled to an underbody 302 of a trailer 300. As illustrated, the stanchion 304 is coupled to the trailer 300 proximate a rear longitudinal edge 318 of the trailer 300, and as such, when a fairing, such as fairing 66 is coupled to the stanchion 304, the fairing 66 extends beyond an outermost edge of the stanchion 304 and proximate to the rear longitudinal edge 318 of the trailer 300. The stanchion 304 includes a first bracket 306 as well as a second bracket 308 (which may be similar to first and second brackets 220, 222 in FIG. 7, respectively). The first bracket 306 is coupled to a first coupling bar 310 and the second bracket 308 is coupled to a second coupling bar 312. The first and second coupling bars 310, 312 are welded to the underbody 302 of the trailer 300, as shown in FIG. 8 with welds 320, although it is to be understood that the coupling bars 310, 312 may be coupled to I-beams 314 on the underbody 302 with bolts, brackets, or other securing means.

The underbody 302 further includes a plurality of tandem holes 316 that include a rearmost tandem hole 322 and a second-to-rear tandem hole 324. In accordance with one aspect of the disclosure, the coupling of the stanchion 304 proximate the rear longitudinal edge 318 of the trailer 300 includes the feature of preventing access to the rearmost tandem hole 322 or to the second to rearmost tandem hole 324 or to both. However, because these tandem holes 322, 324 are rarely, if ever, used, blocking access to the holes 322, 324 is not a practical concern in the overall design of the fairing 66 (FIG. 6) and the location of the stanchions 108 (FIG. 6), 304.

Figure 9:
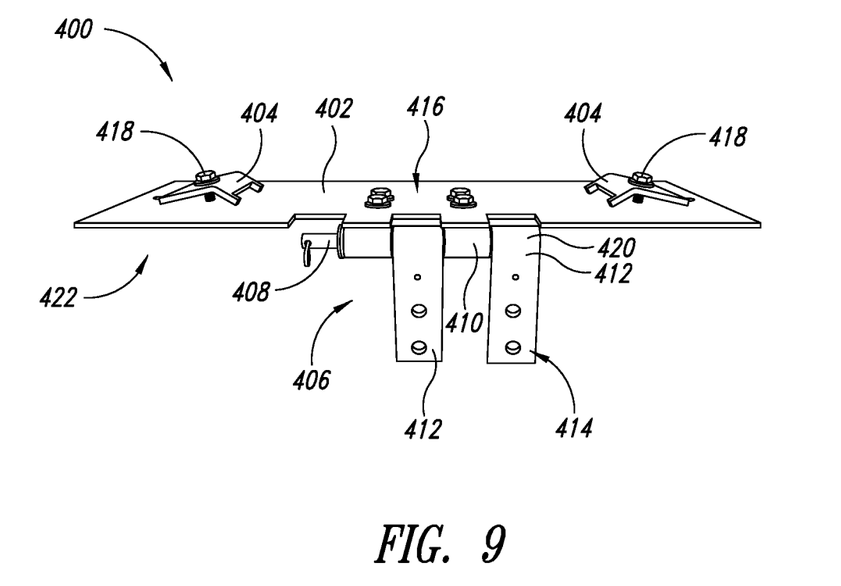
FIG. 9 is a view of a hinge formed accordance with the present disclosure and illustrated unmounted from a trailer.

Referring now to FIG. 9, the hinge 400 is shown in additional detail. The hinge 400 includes the body 402 with a planar first surface 416 and an opposing second planar surface 422. The hinge 400 further includes the pair of brackets 404 wherein each bracket 404 is coupled to the body 402 with a nut and bolt assembly 418. A user can selectively tighten or loosen the nut and bolt assembly 418 to provide a space or gap between the each of the pair of brackets 404 and the first surface 416 of the body 402. Accordingly, when coupling the bracket 404 to an I-beam of a trailer (not shown), a user loosens the nut and bolt assembly 418 of a respective bracket 404 until the user can manipulate the bracket 404 to engage a flange of an I-beam on the underbody (not shown). Then, once the bracket is engaged, the user tightens the respective nut and bolt assembly 418 to securely fasten the bracket 404 to the I-beam (not shown).

The hinge 400 further includes a barrel and pin combination 406. The barrel and pin combination comprises a pin 408, at least one barrel 410, and a pair of arms 412, with each arm 412 including a second barrel 420. Each of the barrels 410, 420 are aligned and the pin 408 is inserted through apertures in each barrel. As such, the arms 412 can rotate relative to the body 402 in at least one degree of freedom. The arms 412 include holes 414, which are used to couple the hinge 400 to a fairing (such as fairing 66 in FIG. 6). Accordingly, when the hinge 400 is coupled to the fairing, the fairing rotates relative to the body 402 via the barrel and pin combination 406, and more specifically, about the pin 408 in at least one degree of freedom. The pivoting or rotation of the arms 412 to move the fairing between the open and closed positions is further assisted by pneumatic actuators, which also hold the arms 412 and the fairing in the open, or raised, position. In one implementation, the hinge 400 is a ⅜ (three-eighths) inch steel plate with a width of 6 inches and a length of 17½ inches, although it is to be understood that the hinge 400 may be formed of other materials and to have a dimensions chosen for aesthetic and non-functional aspects of the appearance and design.

The various implementations described above can be combined to provide further implementations. Various non-functional features, such as radius of curvature, use of corners that are rounded or having other shapes, and other aesthetic or cosmetic features are present to provide an appealing appearance. These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A fairing for use on a trailer having an underbody extending between a front portion and a rear portion of the trailer and a wheel bogie assembly mounted on the underbody and having a forward termination point and a rear termination point, the fairing comprising:

a first frame member coupled to the trailer and extending a majority of a length of the fairing;

a second frame member coupled to the trailer and spaced from the first frame member; and a plurality of panels coupled to the first and second frame members, the plurality of panels having a longitudinal length that extends to at least the rear termination point of the wheel bogie assembly, and wherein the entire fairing is movable as a single piece via the first frame member between an open position that provides access to the underbody of the trailer and a closed position in which the fairing overlies the wheel bogie assembly.

2. The fairing of claim 1 further comprising a latch coupled to one of the plurality of panels having an engaged and a disengaged position, wherein when the latch is in the engaged position the latch secures the fairing in the closed position.

3. The fairing of claim 1 wherein the second frame member includes a peripheral edge, the fairing further comprising a skirt extending along the peripheral edge.

4. The fairing of claim 3 wherein the skirt further includes an outer edge spaced from a driving surface when the fairing is in the closed position.

5. The fairing of claim 3 wherein the skirt is substantially flat and planar.

6. The fairing of claim 4 wherein the space between the outer edge of the skirt and the driving surface is 4 inches.

7. The fairing of claim 1 wherein a first one of the plurality of panels is telescopically received behind a second one of the plurality of panels.

8. The fairing of claim 1 wherein the longitudinal length of the plurality of panels extends from the front portion of the trailer to the rear portion of the trailer and beyond the rear termination point of the wheel bogie assembly.

9. A trailer to be pulled by a tractor having a rear set of wheels, the trailer comprising:

an underbody;

a bogie assembly mounted on the underbody and movable between a forward position and a rear position relative to the rear set of wheels of the tractor, the bogie assembly including a rear outermost longitudinal edge;

a set of rear wheels coupled to the bogie assembly, the rear wheels having an outermost radial edge;

a first stanchion coupled to the trailer;

a second stanchion coupled to the trailer behind the rear outermost longitudinal edge of the bogie assembly when the bogie assembly is in the rear position;

a hinge coupled to the trailer between the first stanchion and the second stanchion, the hinge having a size and a shape to provide a space between an outermost edge of the hinge and the outermost radial edge of the rear wheels of the bogie assembly;

a fairing coupled to the first stanchion, the second stanchion, and the hinge, the fairing having a longitudinal length that extends from at least the first portion of the trailer to the second stanchion; and a lift support coupled between each of the first and second stanchions and the fairing.

10. The trailer of claim 9 wherein the fairing is movable between an open position that provides access to the underbody of the trailer and a closed position in which the fairing overlies the bogie assembly.

11. The of trailer claim 10 wherein the first stanchion and the second stanchion each include a loading block and the fairing includes a complimentary slide block for each loading block, each slide block engaging a respective one of the loading blocks to secure the fairing in the closed position.

12. The trailer of claim 11 wherein each slide block is associated with a latch movable between an engaged position and a disengaged position, in the engaged position, the latch sliding a slide block to engage a complimentary loading block to secure the fairing in the closed position.

13. The trailer of claim 9 wherein the fairing further includes a skirt extending from a peripheral edge of the fairing, the skirt comprised of a flexible material.

14. The trailer of claim 9 further comprising a third stanchion and a fourth stanchion coupled to the trailer between the first and second stanchions, the fairing coupled to the first, second, third, and fourth stanchions.

15. The trailer of claim 9 wherein the space between the outermost edge of the hinge and the outermost radial edge of the rear set of wheels of the bogie assembly is between 3 to 5 inches when the trailer is in an unloaded condition.

16. The trailer of claim 9 wherein the longitudinal length of the fairing extends beyond the second stanchion.

17. The trailer of claim 9 wherein the fairing includes a plurality of panels, a first one of the plurality of panels telescopically received behind a second one of the plurality of panels.

18. A device, comprising:

a fairing configured to be coupled to a trailer, the fairing including a plurality of panels with a first panel of the plurality of panels configured to slide to be at least partially telescopically received behind a second panel of the plurality of panels, wherein the entire fairing is rotatable relative to the trailer as a single piece between an open position that provides access to an underbody of the trailer and a closed position in which the fairing overlies a wheel bogie assembly of the trailer.

19. The device of claim 18 wherein the entire fairing rotates at least 120 degrees between the closed position and the open position.

20. The device of claim 18 wherein the fairing is configured to be coupled to the trailer with an outermost surface of the fairing planar with an outermost surface of the trailer.

* * * * *